United States Patent
Watts, Jr. et al.

[11] Patent Number: 4,791,575
[45] Date of Patent: Dec. 13, 1988

[54] METHOD FOR GENERATING AXIS CONTROL DATA FOR USE IN CONTROLLING A GRINDING MACHINE AND THE LIKE AND SYSTEM THEREFOR

[75] Inventors: Harold G. Watts, Jr., Holden; Michael R. Hunter, West Boylston; Randy E. Thompson, Shrewsbury, all of Mass.

[73] Assignee: The Pratt & Whitney Company, Inc., West Hartford, Conn.

[21] Appl. No.: 925,439

[22] Filed: Oct. 31, 1986

[51] Int. Cl.⁴ .............................................. G06F 15/46
[52] U.S. Cl. ........................... 364/474.36; 51/165.71; 318/569; 364/474.06; 364/474.29
[58] Field of Search ............... 364/174, 474, 475, 513, 364/167-171; 318/573, 568, 569, 570; 51/165.71, 97 NC

[56] References Cited

U.S. PATENT DOCUMENTS

| | | | |
|---|---|---|---|
| 3,970,830 | 7/1976 | White et al. | 364/474 |
| 4,135,239 | 1/1979 | Hamill, III et al. | 364/474 |
| 4,489,522 | 12/1984 | Henseleit et al. | 364/474 |
| 4,502,125 | 2/1985 | Yoneda et al. | 364/474 |
| 4,550,532 | 11/1985 | Fletcher, Jr. et al. | 364/474 |
| 4,558,977 | 12/1985 | Inoue et al. | 364/474 |
| 4,590,573 | 5/1986 | Hahn | 364/474 |
| 4,604,716 | 8/1986 | Kato et al. | 364/174 |
| 4,604,834 | 8/1986 | Thompson | 364/474 |

*Primary Examiner*—Joseph Ruggiero
*Attorney, Agent, or Firm*—Raymond J. Eifler

[57] ABSTRACT

The cam lift data is analyzed (110) through the use of a fast fourier transform (FFT) (116) to thereby obtain FFT coefficients (118) which define the amplitude and frequency content of the cam lift data. Through a combination of the kinematic model and an inverse FFT procedure, an axis control function including a position control function (Eq. 1 and Eq. 14) is determined (128) for each axis. Dynamic compensation (130) of each axis is provided for system lags and inertia loads by altering the axis control function as a proportion of the axis velocity and acceleration (130), respectively. For each controlled axis an independent vector and a corresponding dependent vector containing axis control data is generated (132). During the actual control of first and second drive motors (72, 70) of the grinding machine, position and velocity feedback signals are generated for each axis by feedback devices (82, 78). A master/slave control arrangement is provided between the two axes wherein the positional feedback signal (186) from one axis is utilized in the control of the other axis to eliminate time lags between control of the two axes.

32 Claims, 12 Drawing Sheets

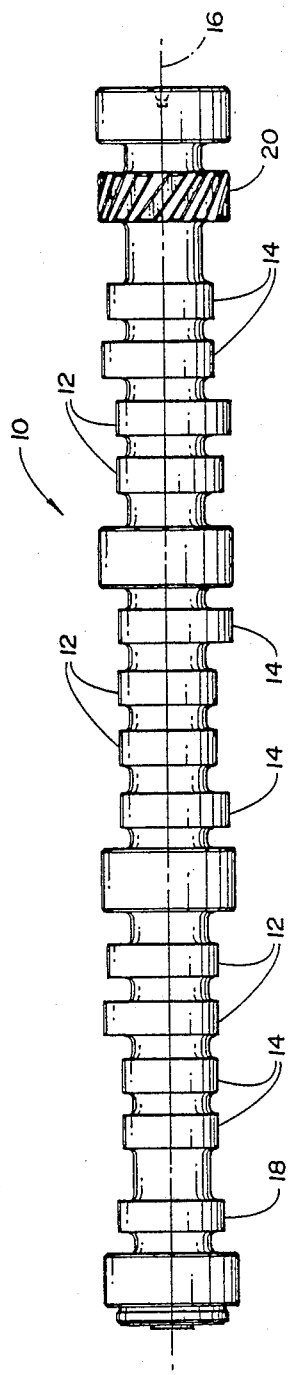
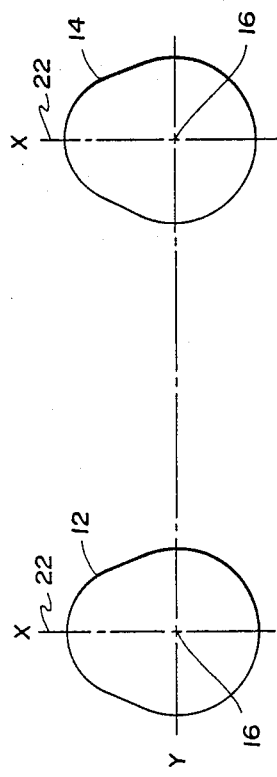
Fig. 1
Fig. 2

Fig. 3A

| DEG | EXHAUST OPENING | CLOSING | INLET OPENING | CLOSING |
|---|---|---|---|---|
| 0 | 0.25563 | | 0.23576 | |
| 1 | 0.25553 | | 0.23565 | |
| 2 | 0.25525 | | 0.23535 | |
| 3 | 0.25478 | | 0.23485 | |
| 4 | 0.25413 | | 0.23415 | |
| 5 | 0.25329 | | 0.23325 | |
| 6 | 0.25226 | | 0.23215 | |
| 7 | 0.25106 | | 0.23085 | |
| 8 | 0.24967 | | 0.22937 | |
| 9 | 0.24810 | | 0.22769 | |
| 10 | 0.24636 | | 0.22583 | |
| 11 | 0.24444 | | 0.22378 | |
| 12 | 0.24235 | | 0.22155 | |
| 13 | 0.24010 | | 0.21914 | |
| 14 | 0.23768 | | 0.21656 | |
| 15 | 0.23509 | | 0.21381 | |
| 16 | 0.23235 | | 0.21090 | |
| 17 | 0.22946 | SAME AS OPENING | 0.20783 | SAME AS OPENING |
| 18 | 0.22642 | | 0.20460 | |
| 19 | 0.22323 | | 0.20123 | |
| 20 | 0.21990 | | 0.19771 | |
| 21 | 0.21644 | | 0.19406 | |
| 22 | 0.21285 | | 0.19028 | |
| 23 | 0.20913 | | 0.18637 | |
| 24 | 0.20530 | | 0.18235 | |
| 25 | 0.20134 | | 0.17822 | |
| 26 | 0.19729 | | 0.17398 | |
| 27 | 0.19313 | | 0.16965 | |
| 28 | 0.18887 | | 0.16523 | |
| 29 | 0.18452 | | 0.16073 | |
| 30 | 0.18010 | | 0.15615 | |
| 31 | 0.17559 | | 0.15151 | |
| 32 | 0.17101 | | 0.14681 | |
| 33 | 0.16637 | | 0.14207 | |
| 34 | 0.16168 | | 0.13728 | |
| 35 | 0.15693 | | 0.13246 | |
| 36 | 0.15215 | | 0.12761 | |
| 37 | 0.14732 | | 0.12275 | |
| 38 | 0.14247 | | 0.11788 | |
| 39 | 0.13759 | | 0.11300 | |
| 40 | 0.13271 | | 0.10814 | |
| 41 | 0.12781 | | 0.10329 | |

Fig. 3B

| DEG | EXHAUST OPENING | CLOSING | INLET OPENING | CLOSING |
|---|---|---|---|---|
| 42 | 0.12291 | | 0.09847 | |
| 43 | 0.11803 | | 0.09368 | |
| 44 | 0.11315 | | 0.08894 | |
| 45 | 0.10830 | | 0.08424 | |
| 46 | 0.10348 | | 0.07960 | |
| 47 | 0.09869 | | 0.07503 | |
| 48 | 0.09394 | | 0.07052 | |
| 49 | 0.08925 | | 0.06610 | |
| 50 | 0.08461 | | 0.06177 | |
| 51 | 0.08003 | | 0.05753 | |
| 52 | 0.07553 | | 0.05340 | |
| 53 | 0.07110 | | 0.04938 | |
| 54 | 0.06675 | | 0.04547 | |
| 55 | 0.06249 | | 0.04169 | |
| 56 | 0.05833 | SAME AS OPENING | 0.03804 | SAME AS OPENING |
| 57 | 0.05428 | | 0.03452 | |
| 58 | 0.05033 | | 0.03115 | |
| 59 | 0.04649 | | 0.02792 | |
| 60 | 0.04277 | | 0.02485 | |
| 61 | 0.03918 | | 0.02194 | |
| 62 | 0.03572 | | 0.01919 | |
| 63 | 0.03239 | | 0.01661 | |
| 64 | 0.02920 | | 0.01420 | |
| 65 | 0.02616 | | 0.01197 | |
| 66 | 0.02327 | | 0.00992 | |
| 67 | 0.02053 | | 0.00806 | |
| 68 | 0.01794 | | 0.00638 | |
| 69 | 0.01552 | | 0.00490 | |
| 70 | 0.01327 | | 0.00360 | |
| 71 | 0.01118 | | 0.00250 | |
| 72 | 0.00926 | | 0.00160 | |
| 73 | 0.00752 | | 0.00090 | |
| 74 | 0.00595 | | 0.00040 | |
| 75 | 0.00456 | | 0.00010 | |
| 76 | 0.00336 | | 0.00000 | |
| 77 | 0.00233 | | 0.00000 | |
| 78 | 0.00149 | | 0.00000 | |
| 79 | 0.00084 | | 0.00000 | |
| 80 | 0.00037 | | 0.00000 | |
| 81 | 0.00009 | | 0.00000 | |
| 82 | 0.00000 | | 0.00000 | |

$$\text{Fig. 11} \begin{cases} \gamma = \theta - \theta_2 & (EQ.1) \\ \gamma' = 1 - \theta_2' & (EQ.2) \\ \gamma'' = -\theta_2'' & (EQ.3) \end{cases}$$

$$\boxed{\theta_2}$$

$$\cos \theta_2 = \frac{R^2 + L^2 - (a - r_F)^2}{2RL} = \frac{C}{D} \quad \text{(EQ. 4)}$$

$$\cos' \theta_2 = \left[\frac{C'}{D} - \frac{D'C}{D^2}\right] \quad \text{WHERE} \quad \begin{array}{l} C' = 2RR' + 2LL' \\ D' = 2R'L + 2RL' \end{array} \quad \text{(EQ. 5)}$$

$$\begin{cases} \cos'' \theta_2 = \frac{C''}{D} - \frac{(D''C + 2C'D')}{D^2} + \frac{2(D')^2 C}{D^3} \\ \quad \begin{cases} C'' = 2(R')^2 + 2RR'' + 2(L')^2 + 2LL'' \\ D'' = 2R''L + 4R'L' + 2RL'' \end{cases} \end{cases} \quad \text{(EQ. 6)}$$

$$\sin \theta_2 = (a - r_F) * \sin \Gamma / R \quad \text{(EQ. 7)}$$

$$\sin' \theta_2 = (a - r_F) \times \left(\frac{\sin' \Gamma}{R} - \frac{\sin \Gamma R'}{R^2}\right) \quad \text{(EQ. 8)}$$

$$\boxed{\theta_2} = \tan^{-1}\left(\frac{\sin \theta_2}{\cos \theta_2}\right) \quad \text{(EQ. 9)}$$

$$\boxed{\theta_2'} = -\frac{\cos' \theta_2}{\sin \theta_2} \quad \text{(EQ. 10)}$$

$$\theta_2'' = -\frac{\cos'' \theta_2}{\sin \theta_2} + \frac{\cos' \theta_2 \sin' \theta_2}{(\sin \theta_2)^2} \quad \text{(EQ. 11)}$$

*Fig. 12*

Fig. 13  $\boxed{R}$ $$R = \left[L^2 + (a - r_F)^2 - 2L(a - r_F)\cos(\Gamma)\right]^{1/2} \quad (EQ.12)$$

$$\text{LET } V = L^2 + (a - r_F)^2 - 2L(a - r_F)\cos(\Gamma) \quad (EQ.13)$$

$$\boxed{R} = V^{1/2} \quad (EQ.14)$$

$$\boxed{R'} = 1/2\, V^{-1/2} V' \quad (EQ.15)$$

$$\boxed{R''} = -1/4\, V^{-3/2}(V')^2 + 1/2\, V^{-1/2} V'' \quad (EQ.16)$$

$$V' = 2LL' + 2L(a - r_F)\sin(\Gamma)\Gamma' - 2L'(a - r_F)\cos\Gamma \quad (EQ.17)$$

$$\begin{aligned}V'' &= 2(L')^2 + 2LL'' + 2(a - r_F)L\cos(\Gamma)(\Gamma')^2 \\ &+ 2L(a - r_F)\sin(\Gamma)\Gamma'' + 4L'(a - r_F)\sin(\Gamma)\Gamma' \\ &- 2L''(a - r_F)\cos\Gamma\end{aligned} \quad (EQ.18)$$

Fig. 14  $\boxed{r}$ $$r = \left[L^2 + r_F^2 - 2Lr_F\cos(\pi - \Gamma)\right]^{1/2} \quad (EQ.19)$$

$$\text{LET } U = L^2 + r_F^2 - 2Lr_F\cos(\pi - \Gamma) \quad (EQ.20)$$

$$\boxed{r} = U^{1/2} \quad (EQ.21)$$

$$\boxed{r'} = 1/2\, U^{-1/2} U' \quad (EQ.22)$$

$$\boxed{r''} = -1/4\, U^{-3/2}(U')^2 + 1/2\, U^{-1/2} U'' \quad (EQ.23)$$

$$U' = 2LL' - 2L'r_F\cos(\pi - \Gamma) - 2Lr_F\sin(\pi - \Gamma)\Gamma' \quad (EQ.24)$$

$$\begin{aligned}U'' &= 2(L')^2 + 2LL'' - 2L''r_F\cos(\pi - \Gamma) \\ &- 4L'r_F\sin(\pi - \Gamma)\Gamma' + 2Lr_F\cos(\pi - \Gamma)(\Gamma')^2 \\ &- 2Lr_F\sin(\pi - \Gamma)\Gamma''\end{aligned} \quad (EQ.25)$$

$$\boxed{\Gamma}$$

$$\Gamma = \alpha + \pi/2 \qquad (EQ.26)$$

$$\alpha = \beta + \sigma \qquad (EQ.27)$$

$$\beta = \pi/2 - \theta \qquad (EQ.28)$$

$$\sigma = \pi/2 + TAN^{-1}\left(\frac{dy}{dx}\right) \qquad (EQ.29)$$

$$y = L\ SIN\ \theta$$
$$x = L\ COS\ \theta \qquad (EQ.30)$$

$$\frac{dy}{dx} = \frac{dy/d\theta}{dx/d\theta} \qquad (EQ.31)$$

$$\frac{dy}{dx} = \frac{L'\ SIN\ \theta + L\ COS\ \theta}{L'\ COS\ \theta - L\ SIN\ \theta} = \frac{B}{A} \qquad (EQ.32)$$

$$\boxed{\Gamma} = 3/2\pi - \theta + TAN^{-1}\left[\frac{L'\ SIN\ \theta + L\ COS\ \theta}{L'\ COS\ \theta - L\ SIN\ \theta}\right] \qquad (EQ.33)$$

$$\boxed{\Gamma'} = -1 + \left[\frac{1}{1+(B/A)^2}\right] * \left[\frac{B'}{A} - \frac{BA'}{A^2}\right] \qquad (EQ.34)$$

$$\boxed{\Gamma''} = -(1+(B/A)^2)^{-2} * (2B/A)\left(\frac{B'}{A} - \frac{BA'}{A^2}\right)^2 \qquad (EQ.35)$$
$$+ (1+(B/A)^2)^{-1} * \left[\frac{B''}{A} - \frac{(A''B + 2B'A')}{A^2} + \frac{2(A')^2 B}{A^3}\right]$$

WHERE $A' = -2L'\ SIN\ \theta - L\ COS\ \theta + L''\ COS\ \theta$ $A'' = -3L''\ SIN\ \theta - 3L'\ COS\ \theta + L'''\ COS\ \theta + L\ SIN\ \theta$ $B' = 2L'\ COS\ \theta - L\ SIN\ \theta + L''\ SIN\ \theta$ $B'' = 3L''\ COS\ \theta - 3L'\ SIN\ \theta + L'''\ SIN\ \theta - L\ COS\ \theta$ $$(EQ.36)$$

*Fig. 15*

Fig. 16
$$\dot{R} = \frac{dR}{d\theta} \dot{\theta} \quad (EQ.37)$$

$$\dot{\gamma} = \frac{d\gamma}{d\theta} \dot{\theta} \quad (EQ.38)$$

$$\ddot{R} = \frac{d^2 R}{d\theta^2}[\dot{\theta}]^2 + \frac{dR}{d\theta}\ddot{\theta} \quad (EQ.39)$$

$$\ddot{\gamma} = \frac{d^2\gamma}{d\theta^2}[\dot{\theta}]^2 + \frac{d\gamma}{d\theta}\ddot{\theta} \quad (EQ.40)$$

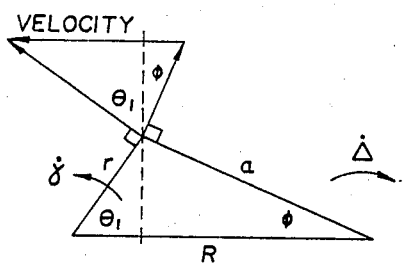

$\boxed{\dot{\theta} \mid \ddot{\theta}}$ $$\left.\begin{array}{l}\dot{\Delta} = \text{ROTATIONAL SPEED OF GRINDING} \\ \quad \text{WHEEL AS A FOLLOWER} \\ r\,\dot{\gamma}\,\cos\theta_1 = -a\,\dot{\Delta}\,\cos\phi\end{array}\right\} \quad (EQ.41)$$

$$-a\dot{\Delta} + a\dot{\phi} = K \quad (EQ.42)$$

$$\dot{\gamma} = \frac{d\gamma}{d\theta}\frac{d\theta}{dt} = \gamma'\dot{\theta} \quad (EQ.43)$$

$$\dot{\phi} = \frac{d\phi}{d\theta}\frac{d\theta}{dt} = \phi'\dot{\theta} \quad (EQ.44)$$

$$\left[r\gamma'\frac{\cos\theta_1}{\cos\phi} + a\phi'\right]\dot{\theta} = K \quad (EQ.45)$$

$$\boxed{\dot{\theta}} = K * \left[r\gamma'\frac{\cos\theta_1}{\cos\phi} + a\phi'\right]^{-1} \quad (EQ.46)$$

$$\boxed{\ddot{\theta}} = K * \left(-\left[r\gamma'\frac{\cos\theta_1}{\cos\phi} + a\phi'\right]^{-2} * \left[(r'\gamma' + r\gamma'')\frac{\cos\theta_1}{\cos\phi}\right.\right.$$
$$\left.\left. + r\gamma'\left(\frac{\cos'\theta_1}{\cos\phi} - \frac{\cos\theta_1 \cos'\phi}{(\cos\phi)^2}\right) + a\phi''\right] * \dot{\theta}\right)$$
$$(EQ.47)$$

Fig. 19
$$\phi' = \frac{-1}{(SIN\phi * COS'\phi)} \quad (EQ.48)$$

$$\phi'' = -\frac{COS''\phi}{SIN\phi} + \frac{COS'\phi \; SIN'\phi}{(SIN\phi)^2} \quad (EQ.49)$$

Fig. 20
$$\boxed{COS\phi} = \left[\frac{R^2 + a^2 - r^2}{2Ra}\right] = \frac{G}{E} \quad (EQ.50)$$

$$SIN\phi = L * SIN\Gamma/R \quad (EQ.51)$$

$$\boxed{COS'\phi} = \left[\frac{G'}{E} - \frac{GE'}{E^2}\right] \quad WHERE \quad \begin{array}{l} G' = 2RR' - 2rr' \\ E' = 2R'a \end{array} \quad (EQ.52)$$

$$SIN'\phi = L' * \frac{SIN\Gamma}{R} + \frac{L}{(a - r_F)} * SIN'(\theta_2) \quad (EQ.53)$$

$$\boxed{COS''\phi} = \left[\frac{G''}{E} - \frac{(E''G + 2G'E')}{E^2} + \frac{2(E')^2 G}{E^3}\right] \quad (EQ.54)$$

WHERE $\quad G'' = 2(R')^2 + 2RR'' - 2(r')^2 - 2rr''$
$\quad\quad\quad\quad E'' = 2R''a$ Fig. 21
$$\boxed{COS\theta_1} = \left[\frac{R^2 + r^2 - a^2}{2Rr}\right] = \frac{C_1}{D_1} \quad (EQ.55)$$

$$\boxed{COS'\theta_1} = \left[\frac{C_1'}{D_1} - \frac{C_1 D_1'}{D_1^2}\right] \quad (EQ.56)$$

WHERE $\quad C_1' = 2RR' + 2rr'$
$\quad\quad\quad\quad D_1' = 2R'r + 2Rr'$

METHOD FOR GENERATING AXIS CONTROL DATA FOR USE IN CONTROLLING A GRINDING MACHINE AND THE LIKE AND SYSTEM THEREFOR

This invention relates, in general, to method and system for generating axis control data for use in controlling a machine tool and, in particular, to method and system for generating axis control data for use in controlling a grinding machine to grind camshafts.

MACHINE TOOL CONTROL

The evolution of machine tool technology has been paced by dramatic increases in machine control capability, particularly within the past 25 years. In fact, many machine tool experts credit major improvements in manufacturing productivity and enhancements in workpiece quality over the last several decades to the fast-paced growth of capability of machine tool controls. The basic configurations of many machine tools (lathes, for example) have not changed significantly for many years, by the advent of numerical control, computer numerical control, and related enhancements has spurred important changes in the method employed in manufacturing and has shown great impact on manufacturing cost.

Numerical control (NC), computer numerical control (CNC), and direct numerical control (DNC) have given the manufacturing industry the capability to exercise a new and greater degree of freedom in the designing and manufacturing of products. This new freedom is demonstrated by the ability to automatically produce products requiring complex processing with a very high degree of quality and reliability.

The use of NC in the shop dramatically impacts the flexibility of part design. For example, more accurate prototypes can be produced when NC machine tools are employed. When the part is put into production, closer tolerances often can be held if NC equipment is used.

Numerical control machines which have contouring ability can be economically used to eliminate the cost of special form tools. By the elimination of these special tools, the design flexibility to make engineering changes is greatly simplified. In most cases, an engineering change means a change in the part program and the tape or other program storage media which controls the machine.

When a new design is introduced, it is advantageous to the engineering department to see this design in actual hardware as soon as economically possible. Numerical control has made this lead time short because of the elimination of the need for special tools and fixtures. This allows the designer to review his design and make any necessary engineering and design changes in a short period of time, thus decreasing the time from the drawing board to the finished product.

Parts which are manufactured on numerically controlled machine tools often are more representative of the actual engineering design than those made by conventional means. A major reason for this is that the manufacturing of the part and the decisions involved in the manufacturing of the part are removed from the hands of the operator of the machine tool and placed in the hands of the part programmer. The machine operator has little or no control over the sequence of operations or over the tools that are to be used. The tolerances which are designed into the control tape or other program storage media and into the tooling that is used are repetitive on all the parts. These features lead to manufacturing consistency.

Another important benefit available through the use of NC is that, in the future, parts which are manufactured only for service will be the same as parts made during normal production runs at the time the product was originally manufactured. This allows manufacturing specifications to be established which are consistent throughout the life of the part as well as in any parts that are used for service in the future.

One of the prime advantages of manufacturing with numerically controlled machine tools, from the standpoint of the designer engineer, is the ability to design a part which can be quickly and economically manufactured. This is in contrast to the requirements of conventional machine tools which often require form cutters. In many cases, special machines were formerly required to produce parts which today are produced quickly and economically on machines with contouring ability.

CAM GRINDING

Large numbers of cams in almost limitless configurations are required in modern industrial equipment. To reduce wear on these cams, their surfaces are often hardened and then ground. Grinding is used to finish such parts as the distributor cams for internal-combustion engines. Also, pistons in an internal-combustion engine, although not cams, are oval in shape and are therefore finished by a cam-grinding technique. The most important high-production application of cam grinding is the finishing of the contours on the lobes of camshafts of automobile engines.

Most prior art cam grinders are themselves cam actuated. One problem that is encountered as a result of this involves the geometrical design of the master cam and follower to create the proper contour on the product cam. Another problem involves accommodating the peculiarities in the grinding process that are associated with the generation of the contour. A third problem involves modifying the tooling to compensate for the effects of the grinding process.

Cams are generated by a grinding wheel of fairly large radius, but the cams actuate tappets that have a curvature quite different. This difference must be accommodated in the master-cam contour. Tappets in automobile engines move linearly, while the cam contour is typically created by a rocking motion. Consequently, geometric conversion of tappet lift data is required. The desired contour may require high accelerations and steep rates of change of acceleration. Cam-grinder generating mechanisms must be capable of responding to such contours.

For convenience, the camshaft is generally rotated at constant angular velocity while the cams are being generated. This causes varying work speed around the cam, which, in turn, affects the grinding action. Also, at constant rotation speed, the flank of the lobe sweeps by the grinding wheel in a very short time. For example, the flank which may represent one-fourth or one-fifth of the periphery of the cam, may be in contact with the wheel only 3–5% of the time. If the flank is flat, the grinding time approaches zero.

Grinding may be done on center, above center, or below center. This affects the grinding action and the forces imposed on the cam-grinding mechanisms. Some machines are available with variable workhead rotational speed. Using preprogrammed input to a servomotor driving the workhead, the rotational speed varies within a revolution of the camshaft in order to distribute the grinding forces evenly along the cam profile. This feature reduces potential grinding burns and enhances the profile accuracy of the cam.

Wheel wear results in changes in contour and in grinding action. For example, 2" (50 mm) of diametral wheel wear causes the flank of the cam to be "fat" by about 0.002" (0.05 mm). To improve the cam accuracy and the inherent profile variation caused by the excessive change in grinding wheel diameter, specially built cam grinders equipped to properly true and dress cubic boron nitride are commercially available. The minor changes in diameter from a new to worn cubic boron nitride grinding wheel provides more consistent cam profile throughout the useable life of the wheel. These major factors, plus many other variables in the process, make tooling of a grinder a highly specialized engineering technique.

An automatic cam-grinding machine is similar to an external cylindrical grinder except that the table is equipped with a rock-bar mechanism which allows the work to move toward and away from the wheel with each revolution of the work. The work-supporting centers and a steadyrest are mounted on the rocker bar. The rocking motion permits generation of the cam contour.

Inside the workhead, the work spindle carries master cams, one for each lobe on the camshaft being ground. A master-cam roller is brought in contact with the appropriate master cam. After one lobe is ground, the table traverses to bring the next lobe in front of the wheel. At the same time, the master-cam roller is indexed to the next master cam. Thus, the cam lobes are ground consecutively down the shaft.

In addition to contour generation, cam grinders are usually required to produce a slight axial taper (an angle of a few minutes) on the cams. The taper may be in alternate directions on successive lobes. This is accomplished by swiveling the wheel slide back and forth relative to the base with each index of the table.

Camshafts are mounted on centers in the machine and are driven by dogs. A steadyrest is set up on the middle bearing, which is usually ground in a prior operation. Sometimes two steadyrests are employed on long shafts. Work speeds are relatively low (80–160 rpm for roughing, 20–50 rpm for finishing) because of the accelerations imposed by the contour.

In cam grinding, critical dimensions are the lift and the rate of change of lift with angular rotation. The work size (base-circle diameter) is not critical; size is controlled simply by feeding the wheel slide to a positive stop. For greater accuracy, grinders are equipped with automatic size control; however, due to the complexity of the gaging and the response time of the machine controls, a slight loss of productivity can be anticipated.

Wheel wear from cam to cam is accommodated by swiveling the worktable slightly, and then the total effect of the wheel worn and dressed away is compensated after each trueing. The master cam and the characteristics of the grinder determine the contour that will be obtained. Tolerances are in the order of a few tenthousandths of an inch (about 0.006 mm) and each inlet and each exhaust cam must be like the others. This requires good repeatability in the master cams, the machine, and the grinding process.

One of the causes of lack of repeatability in the contour is the increasing curvature of the wheel as it wears. This effect is so critical in some cases that only 1" (25.4 mm) of wheel wear radially is permissible on a 24" (610 mm) diameter wheel. To extend the useful life of the wheel, or to make further improvements in contour repeatability, an additional set of master cams may be supplied in the workhead. For example, camshafts for V-8 engines have 16 lobes, and the cam grinder is normally provided with 16 master cams. As an option, a master-cam spindle with 32 cams can be provided. Sixteen of these are ground to the correct contour with a full-sized wheel; the other 16 generate the proper shape when the wheel is partially worn. The master-cam roller is shifted from one set of master cams to the other when the wheel has served half its useful life.

Automatic camshaft grinders can grind a camshaft for a V-8 automobile engine (from cast lobes to finished contours) in less than five minutes. These machines are specialized in their application and are tooled for one particular camshaft. Prototype camshafts have been made on numerically controlled grinders and numerical control has also been applied in the manufacturing operation for the master cam.

The prior art includes a profile machining apparatus for machining cam profiles which includes three microprocessors including an axis control unit. A memory has three different files. The first file stores polar-coordinate information for each shape to be generated; the second file contains apparatus constants relating to the generated geometry of the apparatus; and, a third file contains component velocity information and profile selection from the profiles stored in the first file. One of the microprocessors is programmed to model the cam generating geometry of the apparatus and converts the master cam follower lift data as specified in the component drawing to a form which is usable by the axis control unit. U.S. Pat. No. 4,501,093 entitled "Profile Machining Apparatus" and issued Feb. 26, 1985 is an example of such prior art.

The prior art also includes a numerical controller for cam grinding machines including a memory for storing profile data of a cam corresponding to angular positions thereof. A data processor is provided for reading out the profile data from the memory so as to generate rotational speed commands indicating a rotational speed of the cam and a speed rate command indicating a speed rate of the grinding wheel at every unit angle of rotation of the cam. The rotational speed command and the speed rate command are coordinated so as to reduce the rotation speed of the cam and the speed rate of the grinding wheel when side portions of the cam are ground. U.S. Pat. No. 4,400,781 entitled "Numerical Controller for Cam Grinding Machine" and issued Aug. 23, 1983 is an example of such prior art.

SUMMARY OF THE INVENTION

An advantage of the present invention is to provide a method and system for generating axis control data which is usable by first and second drive axis controllers which, in turn, control first and second drive mechanisms of a machine tool, respectively, to produce workpieces in a relatively cost-efficient fashion.

Another advantage of the present invention is to provide a method and system for controlling first and second drive mechanisms of a machine tool to control machining of a workpiece, such as a camshaft, at a machine station without the need for a master cam.

The methods of the present invention comprise the steps of generating a kinematic model relating the coordinate frame of the workpiece to the coordinate frame of the machine tool. A digital signal related to the desired contour of at least one portion of the workpiece to be machined at the machining station is generated to obtain digitized machining data. A differentiable equation is determined which approximates the machining data. Finally, a conversion algorithm is performed with the kinematic model and the differentiable equation to obtain an axis control function including a position control function for use in providing the axis control data for each controlled axis.

The systems of the present invention include apparatus for performing each of the above-noted method steps to generate axis control data and to control the machine tool.

Preferably, the machine tool comprises a grinding machine which grinds a camshaft at a grinding station through the use of a grinding wheel which moves relative to the rotating camshaft.

Other advantages accruing to the use of the method and system as described above are numerous. For example, the system and method are capable of automatically producing products with extremely high tolerances in a reliable and cost-efficient fashion. Such method and system are particularly useful for use in the mass production of such products as camshafts for automobile engines.

Also, the use of NC dramatically impacts the flexibility of part design without the need to first machine master cams. The present method and system also shorten time lags between engineering design and a prototype of the design. Furthermore, the designer can review his or her design and make any necessary engineering and design changes in a relatively short period of time.

The above advantages and other advantages and features of the present invention are readily apparent from the following detailed description of the invention when taken in connection with the accompanying drawings.

DETAILED DESCRIPTION OF THE INVENTION

FIG. 1 is a side-elevational view of an automotive camshaft which is ground in accordance with the method and system of the present invention;

FIG. 2 is a side-elevational view of typical inlet and exhaust cam lobes on the camshaft of FIG. 1;

FIGS. 3a and 3b illustrate the cam lift data as specified on a camshaft drawing;

FIG. 11 illustrates the equations which represent $\gamma$, the angular position of the camshaft and its derivatives in the coordinate frame of the grinding machine;

FIG. 12 illustrates various equations utilized in solving the equations of FIG. 11;

FIG. 13 illustrates the equations which represent R, the linear position between the camshaft and the grinding wheel, and its derivatives;

FIG. 14 illustrates various equations to be solved to determine functions of the variable, r;

FIG. 15 illustrates various equations to be solved to determine the functions of the variable $\Gamma$;

FIG. 16 illustrates the equations to be solved for various time derivatives of R and $\gamma$;

FIG. 17 is a diagram illustrating the various relationships between the velocity of the grinding wheel and the velocity at the periphery of a cam surface to be ground;

FIG. 18 illustrates the various equations for the angular velocity and acceleration of the camshaft assuming a constant precession rate, K, of the line contact between the grinding wheel and the cam surface;

FIGS. 19 and 20 illustrate the various equations to be solved for different functions of the variable $\xi$; and FIG. 21 illustrates various equations to be solved for different functions of the variable $\theta_1$.

Figure 4:
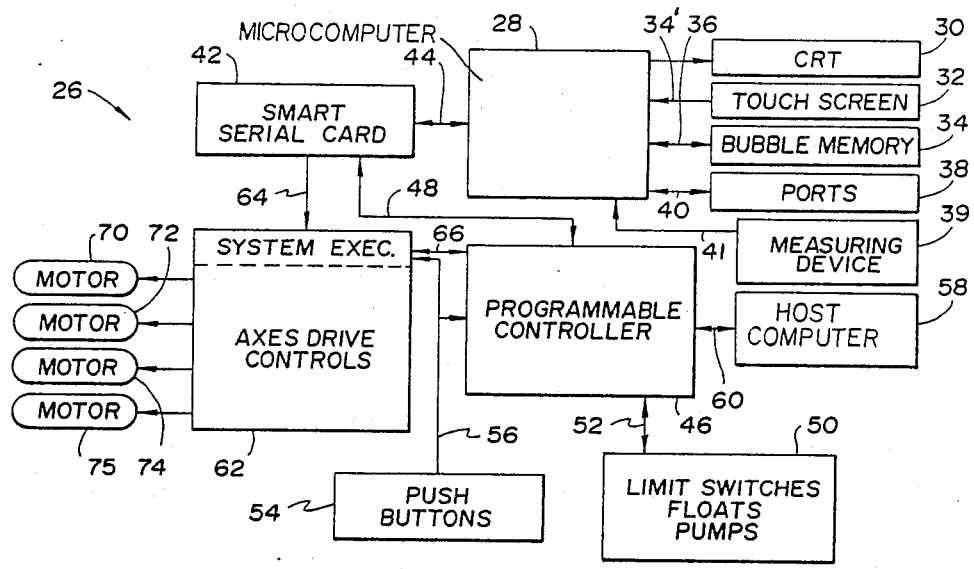
FIG. 4 is a generalized block diagram of the control system of the present invention.

Referring now to the drawing figures, there is illustrated in FIG. 1 a workpiece to be machined by a machine tool under control of the system and method of the present invention. In particular, FIG. 1 illustrates a camshaft, generally indicated at 10, of an automotive vehicle and including a plurality of inlet and exhaust valve lobes 12 and 14, respectively spaced along its longitudinal axis 16. The cam lobes 14 and 16 are ground by a grinding machine controlled by the method and system of the present invention. The camshaft 10 also includes a fuel pump eccentric 18 disposed at one end of the camshaft 10 and a distributor drive gear 20 disposed at the opposite end of the camshaft 10.

Referring now to FIG. 2 there is illustrated a side view of one of the inlet cam lobes 12 and one of the exhaust cam lobes 14. Both cam lobes 12 and 14 are illustrated in their zero degree position wherein the outer periphery of each of the cam lobes 12 and 14 is at its greatest distance away from the axis 16 along an X-axis 22. When followers (not shown) of the automotive vehicle rides on the cam lobes 12 and 14 in the zero degree positions, the respective inlet and exhaust valves of the vehicle engine are fully open. Depending upon the direction of rotation of the cam lobes 12 and 14 from the zero degree positions, the cam lobes 12 and 14, through the followers, either open or close their respective inlet and exhaust valves.

Referring now to FIGS. 3a and 3b there is illustrated in graphical form, cam lift data which describes the follower lift. The cam lift data is related to the contour of the cam lift section of the cam lobes 12 and 14, respectively. The cam lift data is typically specified on a camshaft drawing and describes the follower lift for the inlet and exhaust valves. For example, at the zero degree position, the heights of the cam lift sections are at their maximum and as the cam lobes 12 and 14 are rotated from their zero degree positions, the heights of their respective cam lift sections gradually decreases until the cam lift sections disappear. As illustrated in FIGS. 3a and 3b, the cam lift data is shown for a 0.70"

diameter in-line roller follower for the camshaft 10. However, it is to be understood that flat or point followers could also be used.

The cam lift data for the closing half of each of the inlet and exhaust cam lobes 12 and 14, respectively, is typically identical to the cam lift data for its opening half. This is further illustrated in FIG. 2 by the symmetry of the cam lift sections of the cam lobes 12 and 14 about the X-axis 22. The cam lift sections of the cam lobes 12 and 14 must be ground to an extremely high tolerance. For example, the cam lift sections must be ground to a dimension having five significant figures.

Referring now to FIG. 4 there is illustrated in block diagram form a control system, generally indicated at 26, for controlling a machine tool such as a grinding machine to grind the cam lobes 12 and 14 of camshaft 10 according to the data as exemplified in FIGS. 3a and 3b on a production basis. It is to be understood that the control system 26 is not limited to the control of any particular type of grinding machine or machine tool. Rather, the control system 26 can control any type of grinding machine or machine tool having a first drive mechanism which moves a rotating grinding wheel relative to the camshaft 10 and a second drive mechanism which rotates the camshaft 10. Such a grinding machine is illustrated in the previously noted U.S. Pat. No. 4,400,781.

In general, the control system 26 includes multiple cooperative processors which relate to one another in a hierarchial fashion to control a grinding machine, or similar machine tool. The use of multiple, cooperative processors increases the speed, accuracy and ease in separating the various control functions of the system 26, such as programming, number computation, operation and maintenance.

One level of control for the system 26 is provided by a computer 28 which preferably comprises a conventional microcomputer. The computer 28 is coupled to numerous input and output peripheral devices, such as a color CRT 30, a touch screen 32 through an RS-232 communication link 34', a bubble memory 34 through a PC bus 36 and various ports 38 through an RS-232 link 40. The bubble memory 34 comprises a field-actuated magnetic bubble memory having a bubble memory element which stores cam profile and part program data as well as other forms of machining data.

The computer 28 is programmed as described hereinbelow to provide numerical calculations for cam profile generation and mass storage of part programs in a high-speed integrated circuit memory (not shown) upon transfer of the programs from the bubble memory 34 via an internal interface circuit (not shown).

The computer 28 communicates with the remainder of the control system 26 via a smart serial card 42 through an RS-232 communication link 44. In turn, the smart serial card 42 communicates with a programmable controller 46 which includes interface circuitry via an RS-232 communication link 48. The programmable controller 46 provides the various life support functions of a controlled grinding machine. For example, block 50 schematically illustrates various limit switches, floats and pumps which are not only controlled by the programmable controller 46, but which also send information to the programmable controller through a bi-directional communication link 52.

The programmable controller 46 is also in communication with push buttons, schematically illustrated by block 54, which are located at the machine tool for operation by the grinding machine operator. The push buttons 54 are coupled to the programmable controller 46 through a communication link 56.

The programmable controller 46 is also capable of communicating with an outside device, such as a host or a main frame computer 58 through a bi-directional communication link 60. It is envisioned that the communication link 60 is capable of establishing MAP communications with the outside device 58.

Also, preferably, the programmable controller 46 is also capable of communicating with other devices and apparatus associated with a grinding machine, such as a part handler (not shown), a wheel changer (not shown) and the like.

The system 26 also preferably includes a measuring device 39 which is capable of measuring a previously ground camshaft, such as the camshaft 10, to obtain lift data which is communicated to the computer 28 via an RS-232 communication link 41. The computer 28 operates upon the measured lift data as is described in greater detail hereinbelow.

Block 62 represents a system executive and also the axes drive controls for the various motorized axes of the grinding machine. The smart serial card 42 communicates with the system executive through an RS-232 communicaton link 64. The system executive has stored therein the current part program and the current cam profile to be ground by the grinding machine. The system executive is also in communication with the programmable controller 46 through an RS-232 bi-directional communication link 66 and related interface circuitry. The system executive is also coupled to the push buttons 54 through the communication link 56.

Figure 5:
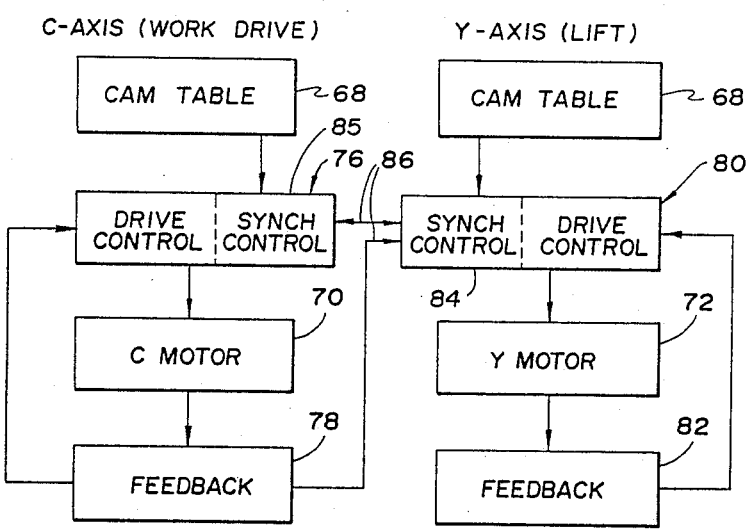
FIG. 5 is a block diagram of servo control circuits in the present invention.
Figure 6:
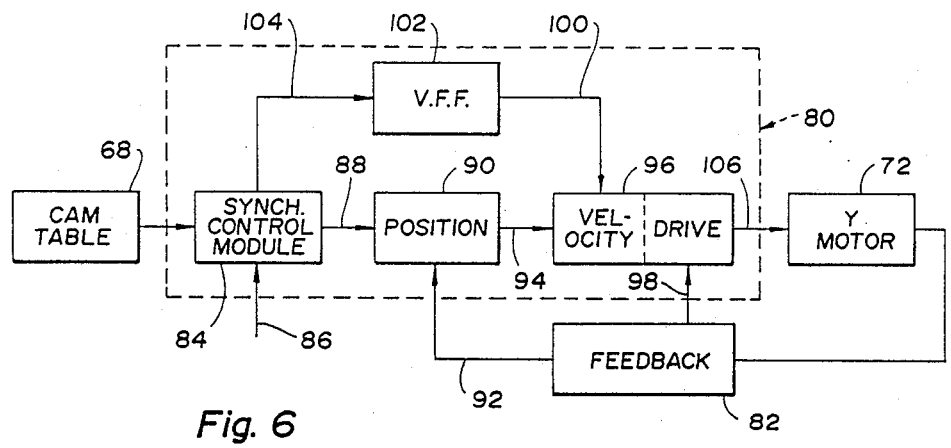
FIG. 6 is a more detailed block diagram of one of the servo control circuits of FIG. 5.

In general, the axes drive controls of the block 62 utilizes cam table data indicated in FIGURES 5 and 6 at 68 to control first and second drive mechanisms or motors 70 and 72. Each of the drive motors 70 and 72 preferably comprises a brushless AC servo motor. The motor 70 powers the C-axis or work drive axis to rotate the camshaft 10. The motor 72 powers the Y-axis or lift axis of the grinding machine to provide relative movement between the grinding wheel and the camshaft 10. Preferably, the motor 72 provides for relative vertical movement of the grinding wheel.

The axes drive control portion of the block 62 also controls motors 74 and 75. The motor 74 preferably comprises a stepper motor for use with a truing device (not shown) to restore the concentricity of the grinding wheel, as needed. The motor 75 moves the camshaft 10 along its longitudinal axis 16 to preset positions corresponding to the locations of the lobes 12 and 14 along the camshaft 10. In this way, a single grinding wheel is capable of grinding each of the cam lobes 12 and 14.

A drive control, generally indicated at 76, of the C-motor 70 includes a synchronization control module 85 which receives data in the form of a pair of independent and dependent vectors from the cam table 68. In general, that data is utilized by the remainder of the drive control 76 to generate a velocity control signal for the C-motor 70. Feedback devices 78 provide a velocity control signal with the C-motor 70. Feedback circuits illustrated by block 78 provide positional and velocity feedback information to the drive control 76 to thereby provide a closed loop control.

In like fashion, a drive control, generally indicated at 80, includes a synchronization control module 84 which receives data from the cam table 68 in the form of a second pair of independent and dependent vectors. In general, that data is utilized by the remainder of the drive control 80 to generate a velocity control signal for the Y-motor 72. Feedback devices 82 provide positional and velocity feedback information to the drive control 80 to thereby also provide a closed loop control.

Preferably, the feedback devices 78 and 82 include a resolver and an R to D converter to provide positional feedback information in a conventional fashion. The feedback devices 78 and 82 also include a tachometer to provide velocity feedback information in a conventional fashion.

Referring now to FIG. 6 there is illustrated in detail the drive control 80. While the drive control 76 is not disclosed in detail, it is to be understood that components of the two drive controls 76 and 80 are substantially identical, except as specifically noted.

The synchronization control module 84 includes a buffer or storage for receiving and storing cam table data from the cam table 68. As previously mentioned, the cam table data for the module 84 takes the form of two vectors, an independent vector and a dependent vector dependent on the independent vector. The data in the dependent vector corresponds on a one-to-one basis with the data in the independent vector. The independent vector contains data relating to the angular position of the camshaft 10 within the grinding machine and the dependent vector contains data relating to the relative linear position between the camshaft axis 16 and the axis of rotation of the grinding wheel.

The module 84 exchanges synchronization information with the synchronization control module 85 of the drive control 76 so that the C and Y-axes are synchronized. The module 84 receives a positional feedback signal from the feedback devices 78 along lines 86. The feedback signal contains the actual position of the output shaft of the C-motor 70 and, consequently, the angular position of the camshaft 10 with respect to the grinding machine.

If a match occurs between the feedback signal and one of the angular positions in the table, the module 84 looks up the corresponding data in the dependent vector and outputs that data in the form of a reference signal. The reference signal corresponds to the desired relative linear position of the grinding wheel with respect to the camshaft 10. If the actual angular position of the camshaft 10 does not coincide with any one of the angular positions represented by the independent vector of data, an interpolator within the module 84 performs an interpolation process on the vectors of data so that the reference signal appearing on line 88 is accurate.

The reference signal appearing on line 88 is fed into a position comparator and error generator block 90 which also receives a positional feedback signal appearing on a line 92 from the feedback devices 82. The block 90 outputs a positional correction signal on line 94 which is coupled to a velocity command and correction drive module 96. The drive portion of the module 96 receives a velocity feedback signal on line 98 which is coupled to the feedback devices 82. The velocity command and correction portion of the module 96 also receives a signal along a line 100 from a velocity feed forward module 102 which, in turn, is coupled to the synchronization control module 84 by a line 104. The velocity feed forward module 102 looks ahead in the cam table data stored in tabular form in the module 84 to provide an output signal to compensate for relatively large increases or decreases in the change in linear velocity. The signal on line 100 is utilized by the module 96 to give the motor 72 a head start in either accelerating or decelerating.

The drive portion of the module 96 receives a velocity reference signal from the velocity command and correction portion of the block 96 and outputs a velocity command on the line 106 which causes the motor 72 to rotate at the commanded velocity. The actual velocity of the motor 72 is provided by the feedback devices 82 to the drive portion of the module 96 and is compared to the velocity reference signal. The resultant error causes the commanded velocity or control signal on line 106 to be adjusted in order to eliminate velocity error.

CONVERSION OF CAM LIFT DATA TO CAM TABLE DATA

Figure 7:
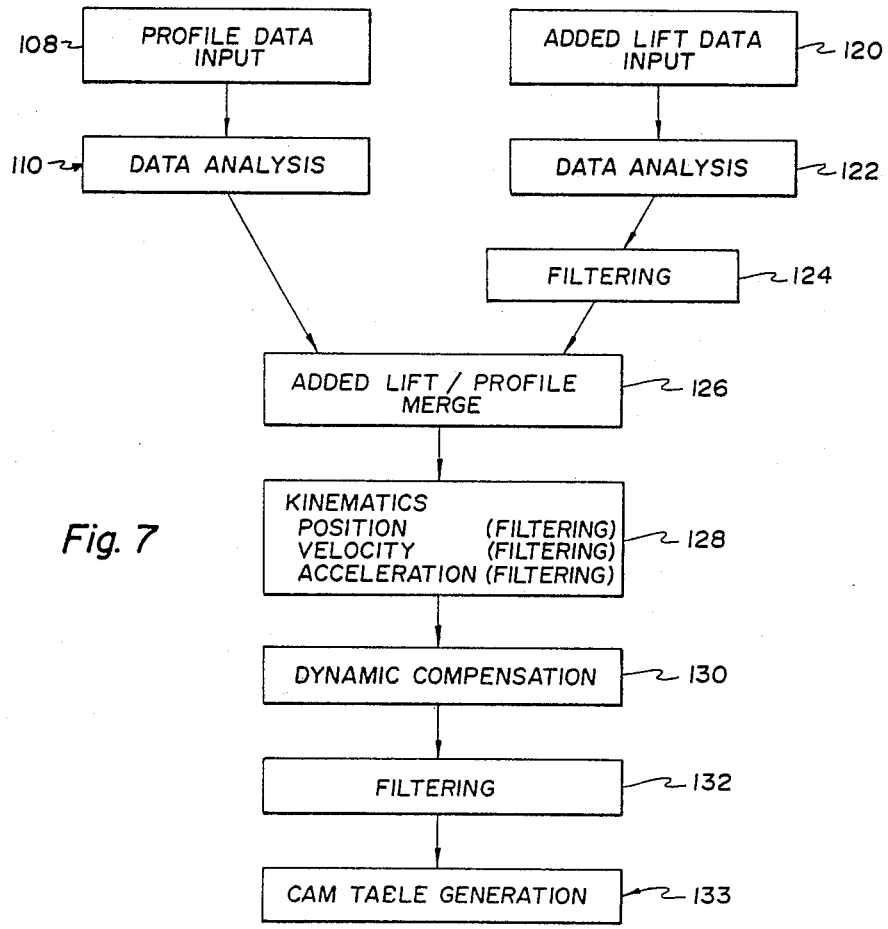
FIG. 7 is a block diagram of the method to convert the cam lift data of FIGS. 3a and 3b into a form which is usable by the servo control circuits of FIG. 5.

Referring now to FIG. 7 there is illustrated in block diagram form the various steps required to convert cam lift data, such as appears in FIGS. 3a and 3b into stored cam table data 68 which is utilized by the control system 26 to control a machine tool such as a grinding machine, as previously described.

In block 108, the data from the drawing of the camshaft 10 is input into the system 26, such as through one of the ports 38 or from the memory 34 and into the computer 28. The data is then analyzed as indicated by block 110.

Figure 8:
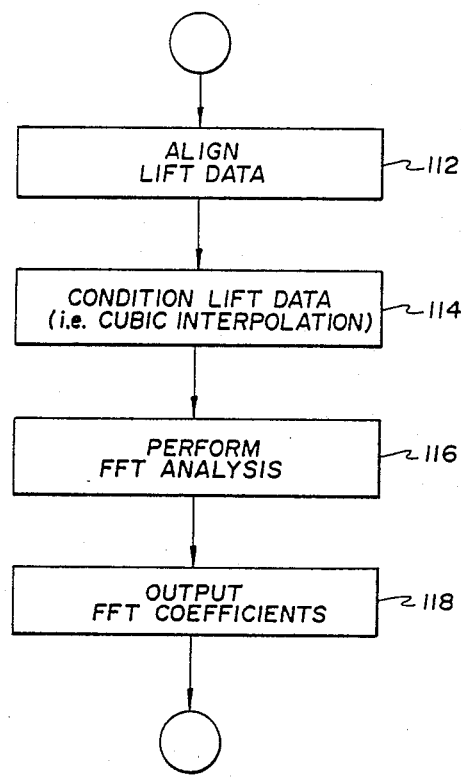
FIG. 8 is a detailed block diagram of each of the data analysis blocks of FIG. 7.

Referring now to FIG. 8 there are indicated the various steps taken by the computer 28 in analyzing the cam lift data. In block 112, the cam lift data is aligned in the direction in which the cam lobes 12 and 14 are to be ground. For example, the cam lift data is aligned in the direction of camshaft rotation during the grinding operation.

In block 114, the lift data is conditioned for the fast fourier transform (FFT) analysis step of block 116. FFT analysis is performed on the cam lift data in order to approximate the cam lift data by a fourier series, the components of which comprise a linear combination of sine and cosine functions. For conventional FFT analysis either 256, 512 or 1024 data points having even increments are required. Consequently, as indicated by block 114, a cubic interpolation process is performed on the cam lift data until the required number of data points is obtained.

In block 116, FFT analysis is performed in a conventional fashion on the cam lift data to determine the amplitude and frequency content thereof. The FFT analysis procedure can be viewed as changing the cam lift data in the angular domain into the frequency domain, thereby obtaining the frequency content of the cam lift data.

In block 118, a plurality of FFT coefficients is obtained, half of which provide frequency information, the other half of which provide corresponding amplitude information. Preferably, only 15 to 25 of the FFT coefficients are actually used as further described hereinbelow to define the cam lift data. The use of this relatively small number of coefficients provides filtering, yet only results in a decrease in accuracy of less than 0.01%.

In step 120, the measured cam lift data from the measuring device 39 is input as previously described. In step 122, this data is analyzed in the same fashion as the original cam lift data. In step 124, filtering of the resulting FFT coefficients is accomplished by utilizing the most significant coefficients, in the same fashion.

In step 126, the measured and original cam lift data are combined. This combination is relatively easy to accomplish since all of the FFT coefficients are in the frequency domain. Adding the measured cam lift data increases grinding accuracy by approximately one-half of one percent in some applications.

In block 128, an algorithm is performed on the resulting FFT coefficients with a previously generated kinematic model which relates the coordinate frame of the camshaft 10 to the coordinate frame of the grinding machine. In general, the kinematic model comprises a series of equations which can be solved to convert the angular position, velocity and acceleration of the camshaft 10 during its actual operation into the corresponding relative linear position, velocity and acceleration of the grinding wheel with respect to the camshaft 10 without reference to any related masses or forces.

Figure 10:
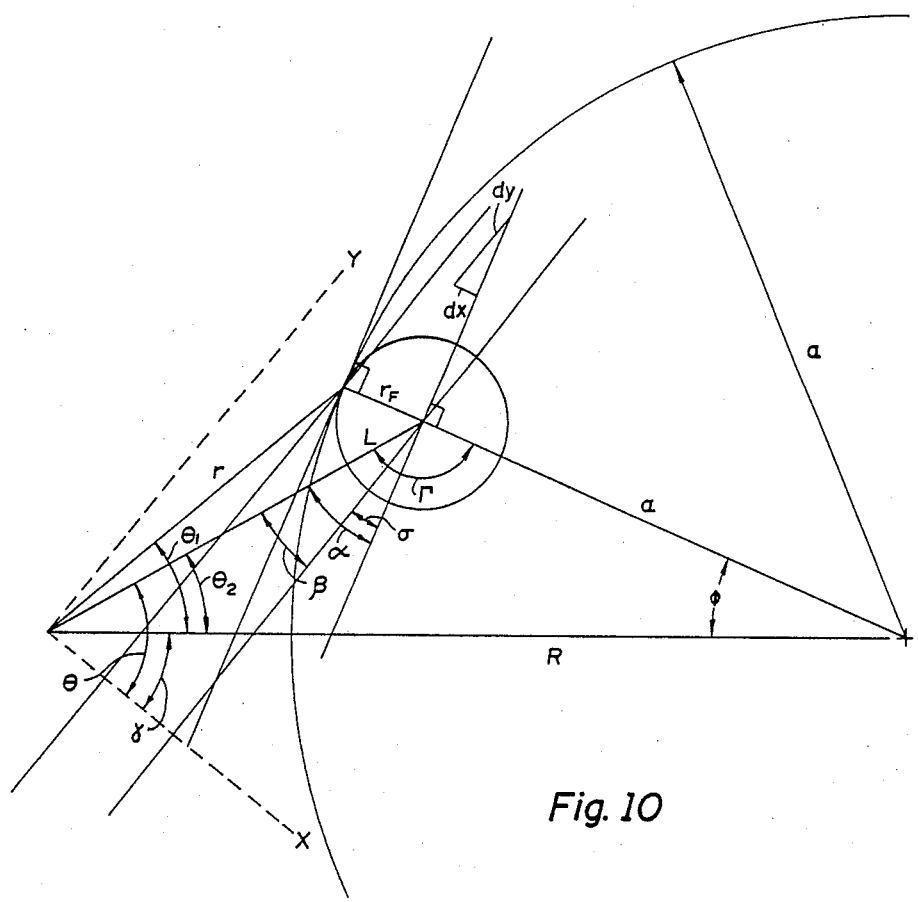
FIG. 10 is a diagram illustrating the relationship between the coordinate frame of the camshaft and its follower and the coordinate frame of the grinding machine.

Referring to FIG. 10 there are illustrated the various variables and constants which are utilized to prepare the kinematic model of FIGS. 10 through 21. The symbols illustrated in FIG. 10 represent the following:

a=grinding wheel radius;
R=distance between axes of rotation of grinding wheel and camshaft;
$r_F$=radius of roller follower to be used;
r=distance between axis of rotation of camshaft and intersection between periphery of roller follower and periphery of grinding wheel (i.e. describes desired contour);
L=lift function (i.e. function of $\theta$, from cam lift data);
x,y=coordinate system on the camshaft, (i.e. see FIG. 2);
$\theta$=angle between x-axis and L;
$\gamma$=angle between x-axis and R;
$\theta_1$=angle between R and r;
$\theta_2$=angle between R and L;
$\phi$=angle between a and R;
$\beta$=angle between L and a line perpendicular to x-axis;
$\alpha$=angle between L and a line perpendicular to aligned radii a and $r_F$;
$\sigma$=difference between and
dy/dx=slope of line perpendicular to aligned radii a and $r_F$;
$\pi$=angle between L and a;

As illustrated in FIG. 10, relative movement between the camshaft 10 and the grinding wheel occurs along line, R. The function, L, is represented by the previously described FFT coefficients. The grinding wheel radius, a, and $r_F$ are both given. If the grinding wheel is trued, the radius of the grinding wheel will change and the kinematic model will also change.

In block 128, the position functions $\gamma$ and R, and their first and second derivatives in terms of $\theta$ are determined from the FFT coefficients and the kinematic model. These functions are illustrated by equations 1 through 3 for $\gamma$ and 14 through 16 for R. Equation 1 requires the solution of equation 9, equation 2 requires the solution of equation 10 and equation 3 requires the solution of equation 11. In like fashion, equation 9 requires the solution of equations 4 and 7. Equation 10 requires the solution of equations 7 and 5 and equation 11 requires the solution of equations 7, 6, 5 and 8. Similarly, equation 4 requires the solution of equation 14 which, in turn, requires the solution of equation 33. Equation 7 requires the solution of equations 14 and 33. Equation 5 requires the solution of equations 14 and 15 which, in turn, require the solution of equations 33 and 34. Equation 6 requires the solution of equations 14, 15 and 16. Equation 16 requires the solution of equations 33, 34 and 35. Equation 8 requires the solution of equations 33, 14 and 15.

Consequently, it can be seen that equations 1 through 3 ultimately require the solution of base equations 33, 34 and 35 which are functions of L and its derivatives in terms of $\theta$ and various sine and cosine functions of the angle $\theta$. The various required derivatives of the function L are obtained by a manipulation of the FFT coefficients and by filtering. Filtering is achieved by selecting the desired frequency content to be used in an inverse FFT routine. Unwanted frequencies are eliminated by setting the corresponding FFT coefficients to a value of zero prior to the inverse FFT operation. As previously mentioned, this is relatively easy to accomplish due to the nature of the fourier series which comprises sine and cosine terms.

In like fashion, equations 14, 15 and 16 are solved. Equations 14 through 16 are solving by first solving equations 33 through 35 as previously noted. Equations 26 through 32 are provided to illustrate the derivation of equation 33.

In block 130, there is indicated the step of dynamically compensating the resulting axis control functions which comprise position functions, R and $\gamma$. Both of the position functions are compensated for system lags and inertia loads by adding terms which are generated as a proportion of the axis velocity and axis acceleration as illustrated in Equations 37 through 40. For example, new $\gamma$=old $\gamma + K_v \dot{\gamma}$ and new R=old R+$K'_v \dot{R}$ to compensate for system lags on both axes. To compensate for inertial loads on both axes, the terms $K_a \ddot{\gamma}$ and $K'_a \ddot{R}$ are added to their respective position functions. The constants $K_v$, $K'_v$, $K_a$, and $K'_a$ are all empirically derived.

Equation 37 requires the solution of equation 15 which, as previously mentioned, requires the solution of equations 33 and 34. Equation 37 also requires the solution of equation 46 which is derived from equations 41 though 45 which assume a constant precession rate of the line contact between the cam lobe 14 or 12 and the grinding wheel around the grinding wheel. This is illustrated in particular by equation 42 in combination with FIG. 17.

The solution of equation 46 requires the solution of equations 2, 21, 48, 50 and 55. In turn, the solution of equation 48 requires the solution of equations 52 and 51. The solution to equation 51 requires the solution of equations 33 and 14 and the solution of equation 52 requires the solution to equations 14, 15, 21 and 22. The solution to equation 55 requires the solution to equations 14 and 21 as does the solution to equation 50.

To obtain the solution to equation 39 equation 16 must be solved as well as all the equations which must be solved for the first time derivative of the variable $\theta$. Also, equations 15 and 47 must be solved. Equation 47 requires solution of equations 46, 3, 49, 56 and 55. Equation 49 requires the solution of equations 52, 51, 53 and 54. Equation 54 requires the solution to equations 14, 15, 16, 21, 22, 23 and 33. Equation 56 requires the solution of equations 15, 14, 21 and 22.

Equation 40 requires the solutions to equations 2 and 3 as well as the immediately preceding solutions to the first and second time derivatives of the variable $\theta$.

Although there are a relatively large number of equations to be solved, the computer 28 can be programmed to solve each of the above-noted equations in a relatively straightforward fashion.

In providing the above-noted dynamic compensation by step 130, accuracy of the data in the cam table can be improved anywhere from one-quarter of a percent to one-half of a percent in some applications which involve a relatively fast grinding speed. The only constraint is that by dynamically compensating the position functions the cam profile is now a function of the speed at which it is ground.

In block 132, the new position functions are filtered by selecting the desired frequency content to be used in the inverse FFT routine which is, in turn, utilized when finding the various derivatives of L as previously discussed. Unwanted frequencies are eliminated by setting the corresponding FFT coefficients to a value of zero prior to the inverse FFT operation.

Figure 9:
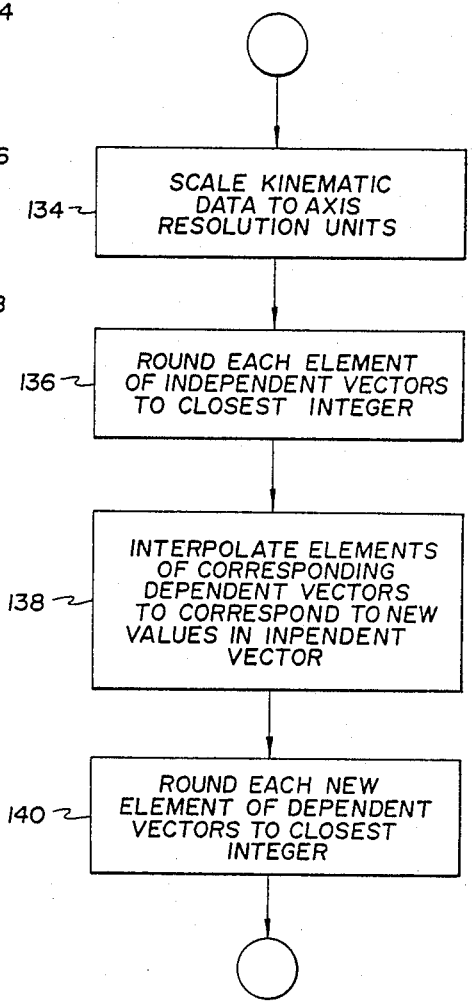
FIG. 9 is a detailed block diagram of the cam table generation block of FIG. 7.

In block 133, the cam table is generated as indicated in the detailed block diagram of FIG. 9. In block 134, the kinematic data is scaled to the axis resolution units which is dependent on the resolution of the hardware of the grinding machine. For each of the controlled axes, C and Y, there is constructed an independent vector and a corresponding dependent vector of data as previously described. For example, for the C-axis the independent vector comprises time increments and the dependent vector comprises corresponding angular positions, $\gamma$.

With respect to the Y-axis, the independent vector includes the same angular positions and the dependent vector comprises the corresponding values for R.

Before the data in the vectors can be properly utilized by the rest of the control system 26, each data element on the independent vectors must be rounded to the closest integer value since most control loops only accept integer values, as indicated by block 136. In block 183, the corresponding data elements in the dependent vectors are interpolated to obtain new values to correspond to the new values in the independent vector for each of the axes. Preferably, a LaGrage interpolation process is used. However, other interpolation methods such as cubic interpolation could be employed.

Finally, in block 140, each of the new data elements in the dependent vectors are rounded to the closest integer value because, again, most control loops only accept integer values. In general, the algorithm disclosed in FIG. 9 minimizes data roundoff errors for the motion control process.

The vectors of data now stored in the cam table 68 are in a form which is usable to control a cam grinding machine, as previously described.

The above described method and system offer many advantages. For example, cam lobes, such as the cam lobes 12 and 14 on the camshaft 10 can be ground to very high tolerances on a production basis without the need for a master cam. Also, the method and system offer a new and greater degree of freedom in the designing and manufacturing of camshafts, such as the camshaft 10. For example, it is relatively easy to make an engineering change in the design of the camshaft 10 and also during production of the camshaft 10. Also, many of the decisions involved in the manufacturing of the camshaft 10 are removed from the hands of the operator of the machine tool and placed in the hands of the part programmer. Tolerances which are designed into the program are repeated on all camshafts thereby leading to manufacturing consistency. The camshaft 10 can be designed quickly and economically manufactured.

We claim:

1. A method of generating axis control data for use by first and second drive axis controllers (80, 76) to control first and second drive mechanisms (72, 70) respectively, of a machine tool having a coordinate frame to control machining of a workpiece (10) having a coordinate frame at a machining station, the first drive mechanism moving a work tool relative to the workpiece and the second drive mechanism rotating the workpiece, the method being characterized by the steps of:
    generating a kinematic model relating the coordinate frame of the workpiece to the coordinate frame of the machine tool;
    generating a digital signal (108) related to the desired contour of at least one portion (12 or 14) of the workpiece to be machined at the machining station to obtain digitized machining data;
    determining a differentiable, periodic equation (110) which approximates the machining data; and
    performing a conversion algorithm (128) with the kinematic model and the differentiable equation to obtain an axis control function (Eqs. 1 and 14) including a position control function for use in providing the axis control data for each of the controlled axes.

2. The method as claimed in claim 1 further comprising the steps of determining a time derivative (Eq. 37 or 38) of at least one of the position control functions to obtain a velocity control function; and combining (130) the position and velocity control function to obtain the axis control function compensated for time lags for the corresponding controlled axis of the machine tool.

3. A method of generating axis control data (68) for use by first and second drive axis controllers (80, 76) to control first and second drive mechanisms (72, 70) respectively, of a grinding machine having a coordinate frame to control grinding of a camshaft (10) having a coordinate frame at a grinding station, the first drive mechanism moving a grinding wheel relative to the camshaft and the second drive mechanism rotating the camshaft, the method being characterized by the steps of:
    generating a kinematic model related to the coordinate frame of the camshaft to the coordinate frame of the grinding machine;
    generating a digital signal (108) related to the desired contour of the cam lift section of at least one noncircular (12 or 14) lobe on the camshaft to be ground at the grinding station to obtain digitized lift data;
    determining a differentiable, periodic equation (110) which approximates the lift data; and
    performing a conversion algorithm (128) with the kinematic model and the differentiable equation to obtain an axis control function (Eqs. 1 and 14) including a position control function for use in providing the axis control data for each of the controlled axes.

4. The method as claimed in claim 3 further comprising the steps of determining a time derivative (Eq. 37 or 38) of at least one of the position control functions to obtain a velocity control function; and combining (130) the position and velocity control functions to obtain the axis control function compensated for time lags for the corresponding controlled axis of the grinding machine.

5. The method as claimed in claim 3 further comprising the steps of determining a time derivative (Eqs. 37 and 38) of each of the position control functions to obtain a velocity control function; and combining (130)

the position and velocity control functions to obtain the axis control function compensated for time lags for each of the controlled axes of the grinding machine.

6. The method as claimed in claim 4 further comprising the steps of determining a time derivative (Eq. 39 or 40) of the velocity control function to obtain an acceleration control function; and combining (130) the acceleration control function with the position and velocity control functions to obtain the axis control function compensated for time lags and the inertia of the drive mechanism for the corresponding controlled axis of the grinding machine.

7. The method as claimed in claim 5 further comprising the steps of determining a time derivative (Eqs. 39 and 40) of each of the velocity control functions to obtain corresponding acceleration control functions; and combining (130) the acceleration control functions with the position and velocity control function to obtain the axis control function compensated for time lags and the inertia of the drive mechanism for each of the corresponding controlled axes of the grinding machine.

8. The method as claimed in claim 5 further comprising the steps of determining a time derivative (Eq. 37 or 38) of at least one of the velocity control functions to obtain an acceleration control function; and combining (130) the acceleration control function with the position control functions to obtain the axis control function compensated by time lags and the inertia of the drive mechanism for the corresponding controlled axis of the grinding machine.

9. The method as claimed in claim 3 or claim 4 or claim 5 or claim 6 or claim 7 or claim 8 wherein said step of determining includes the step of transforming (116) the lift data to obtain frequency data defining the frequency content of the lift data.

10. The method as claimed in claim 9 wherein said frequency data comprises fast fourier transform coefficients and further comprising the step of selecting (118) desired ones of said fast fourier transform coefficients for use during said performing step to filter the transformed lift data.

11. The method as claimed in claim 9 including the step of interpolating (114) the lift data to condition the lift data prior to said step of transforming.

12. The method as claimed in claim 11 wherein said step of interpolating comprises a cubic interpolation process.

13. The method as claimed in claim 3 or claim 4 or claim 5 or claim 6 or claim 7 or claim 8 including the step of generating (133) independent and dependent vectors of axis control data for each of said controlled axes from the axis control functions, the data in the dependent vectors being dependent on the data in their corresponding independent vectors.

14. The method as claimed in claim 13 wherein the axis control data in the independent vector for one of said controlled axes is dependent on the axis control data in the dependent vector for the other of said controlled axes.

15. The method as claimed in claim 3 or claim 4 or claim 5 or claim 6 or claim 7 or claim 8 including the step of generating (133) independent and dependent vectors of axis control data for said controlled axes from the axis control functions, wherein one of the vectors of axis control data for one of said controlled axes is dependent on a vector of axis control data for the other of said controlled axes.

16. The method as claimed in claim 15 wherein the data in one of said independent vectors represents a set of time intervals.

17. The method as claimed on claim 16 wherein the data in another one of said independent vectors represents the angular position of the camshaft in the coordinate frame of the grinding machine.

18. The method as claimed in claim 17 wherein the data in one of said dependent vectors represents the linear position of the camshaft with respect to the grinding wheel in the coordinate frame of the grinding machine.

19. The method as claimed in claim 18 wherein the data in the other of said dependent vectors represents the angular position of the camshaft in the coordinate frame of the grinding machine.

20. The method as claimed in claim 9 further comprising the steps of:
measuring (39) at least one previously ground cam lift section to obtain digital lift data representing the measured section;
transforming (122) the measured lift data to obtain frequency data defining the frequency content of the measured lift data; and
combining (126) the previously transformed lift data and the transformed measured lift data to obtain compensated lift data and wherein the differentiable equation approximates the compensated lift data.

21. A method for controlling a grinding machine having a coordinate frame, the machine including first and second drive mechanisms (72, 70) to control grinding of a camshaft (10) having a coordinate frame at a grinding station, the first drive mechanism moving a grinding wheel relative to the camshaft and the second drive mechanism rotating the camshaft, the method comprising the steps of generating first and second feedback signals (82, 78) indicating the relative linear position of the grinding wheel with respect to the camshaft and the angular position of the camshaft, respectively, generating (133, 68, 84, 85) first and second reference signals, the first reference signal corresponding to the desired relative linear position of the grinding wheel with respect to the camshaft, and the second reference signal corresponding to the desired angular position of the camshaft in the coordinate frame of the grinding machine, comparing (90) the first and second feedback signals with their respective first and second reference signals to provide corresponding first and second control signals (106) to control the first and second drive mechanisms, respectively, the method being characterized by the steps of:
generating a kinematic model relating the coordinate frame of the camshaft to the coordinate frame of the grinding machine;
generating a digital signal (108) related to the desired contour of the cam lift section of at least one non-circular lobe (12 or 14) on the camshaft to be ground at the grinding station to obtain digitized lift data;
determining a differentiable, periodic equation (110) which approximates the lift data; and
performing a conversion algorithm (128) with the kinematic model and the differentiable equation to obtain an axis control function (Eqs. 1 and 14) including a position control function for each of the controlled axes of the grinding machine wherein the first and second reference signals are generated from their respective axis control functions.

22. A method of controlling a grinding machine having a coordinate frame and including first and second drive mechanisms (72, 70) to control grinding of a camshaft (10) having a coordinate frame at a grinding station, the first drive mechanism moving a grinding wheel relative to the camshaft and the second drive mechanism rotating the camshaft, the method comprising the steps of generating first and second reference signals (133, 68, 84, 85), the first reference signal corresponding to the desired relative linear position of the grinding wheel, and the second reference signal corresponding to the desired angular position of the camshaft in the coordinate frame of the grinding machine; comparing (90) the first and second feedback signals with their respective first and second reference signals to provide corresponding first and second control signals (106) to control the first and second drive mechanisms, respectively; the method being characterized by the steps of:
generating a kinematic model relating the coordinate frame of the camshaft to the coordinate frame of the grinding machine;
generating a digital signal (108) related to the desired contour of the cam lift section of at least one non-circular lobe (12 or 14) on the camshaft to be ground at the grinding station to obtain digitized lift data; and
determining a differentiable, periodic equation (110) which approximates the lift data;
performing a conversion algorithm (128) with the kinematic model and the differentiable equation to obtain an axis control function (Eqs. 1 and 14) including a position control function for each of the controlled axes of the grinding machine wherein the first and second reference signals are generated from their respective control functions and wherein one of the reference signals is generated in response to the feedback signal (86) of the other controlled axis (C-axis).

23. A method of controlling a machine tool having a coordinate frame and including first and second drive mechanisms (72, 70) to control machining of a workpiece (10) having a coordinate frame at a machining station, the first drive mechanism moving a work tool relative to the workpiece and the second drive mechanisms rotating the workpiece, the method comprising the steps of generating first and second feedback signals (82, 78) indicating the relative linear position of the work tool with respective to the workpiece and the angular position of the workpiece, respectively; generating first and second reference signals (133, 68, 64, 85), the first reference signal corresponding to the desired relative linear position of the work tool with respect to the workpiece, and the second reference signal corresponding to the desired angular position of the workpiece in the coordinate frame of the machine tool; comparing (90) the first and second feedback signals with their respective first and second reference signals to provide corresponding first and second control signals (106) to control the first and second drive mechanisms, respectively; the method being characterized by the step of:
generating a kinematic model relating the coordinate frame of the workpiece to the coordinate frame of the machine tool;
generating a digital signal (108) related to the desired contour of at least a portion (12, 14) of the workpiece to be machined at the machining station to obtain digitized machining data;
determining a differentiable, periodic equation (110) which approximates the machining data; and
performing a conversion algorithm (128) with the kinematic model and the differentiable equation to obtain an axis control function (Eqs. 1 and 14) including a position control function for each of the controlled axes of the machine tool wherein the first and second reference signals are generated from their respective control functions.

24. A method of controlling a machine tool having a coordinate frame including first and second drive mechanisms (72, 70) to control machining of a workpiece (10) having a coordinate frame at a machining station, the first drive mechanism moving a work tool relative to the workpiece and the second drive mechanism rotating the workpiece, the method comprising the steps of generating first and second feedback signals (82, 78) indicating the relative linear position of the work tool with respect to the workpiece and the angular position of the workpiece, respectively; generating first and second reference signals (133, 68, 84, 85), the first reference signal corresponding to the desired relative linear position of the work tool with respect to the workpiece, and the second reference signal corresponding to the desired angular position of the workpiece in the coordinate frame of the machine tool; comparing (90) the first and second feedback signals with their respective first and second reference signals to provide corresponding first and second control signals (106) to control the first and second drive mechanisms, respectively; the method being characterized by the steps of:
generating a kinematic model relating the coordinate frame of the workpiece to the coordinate frame of the machine tool;
generating a digital signal (108) related to the desired contour of at least a portion of the workpiece to be machined at the machining station to obtain digitized machining data;
determining a differentiable, periodic equation (110) which approximates the machining data; and
performing a conversion algorithm (128) with the kinematic model and the differentiable equation to obtain an axis control function (Eqs. 1 and 14) including a position function for each of the controlled axes of the machine tool; wherein the first and second reference signals are generated from their respective axis control function, and wherein one of the reference signals is generated in response to the feedback signal (86) of the controlled axis (C-axis).

25. A system for generating axis control data for use by first and second drive axis controllers (76, 80) to control first and second drive mechanisms (72, 70), respectively, of a machine tool having a coordinate frame to control machining of a workpiece (10) having a coordinate frame at a machining station, the first drive mechanism moving a work tool relative to the workpiece and the second drive mechanism rotating the work tool, the system being characterized by:
means for generating a kinematic model relating the coordinate frame of the workpiece to the coordinate frame of the machine tool;
means for storing (28 and 34) a digital signal related to the desired contour of at least one portion (12 or 14) of the workpiece to be machined at the machining station to obtain digitized machining data;

means (28 and 110) coupled to said storing means for generating a differentiable, periodic equation which approximates the machining data; and means (28 and 128) for performing a conversion algorithm with the kinematic model and the differentiable equation to obtain an axis control function (Eqs. 1 and 14) including a position control function for use in providing the axis control data for each of the controlled axes.

26. A system for generating axis control data for use by first and second drive axis controllers (76, 80) to control first and second drive mechanisms (72, 70) respectively, of a grinding machine having a coordinate frame to control grinding of a camshaft (10) having a coordinate frame at a grinding station, the first drive mechanism moving a grinding wheel relative to the camshaft and the second drive mechanism rotating the camshaft, the system being characterized by:

means for generating a kinematic model relating the coordinate frame of the camshaft to the coordinate frame of the grinding machine;

means for storing (28 and 34) a digital signal related to the desired contour of the cam lift section of at least one non-circular lobe (12 or 14) on the cam shaft to be ground at the grinding station to obtain digitized lift data;

means (28 and 110) coupled to said storing means for generating a differentiable, periodic equation which approximates the lift data;

means (28 and 128) for performing a conversion algorithm with the kinematic model and the differentiable equation to obtain an axis control function (Eqs. 1 and 14) including a position control function for use in providing the axis control data for each of the controlled axes.

27. A system (26) for controlling a grinding machine having a coordinate frame including first and second drive mechanisms (72, 70) to control grinding of a camshaft (10) having a coordinate frame at a grinding station, the first drive mechanism moving a grinding wheel relative to the camshaft, the system comprising feedback means (82, 78) adapted to be coupled to the first and second drive mechanisms for generating first and second feedback signals (92) respectively, the first and second feedback signals indicating the relative linear position of the grinding wheel with respect to the camshaft and the angular position of the camshaft, respectively; reference signal generating means (68, 84, 85, 133) for generating first and second reference signals, the first reference signal corresponding to the desired relative linear position of the grinding wheel with respect to the camshaft, and the second reference signal corresponding to the desired angular position of the camshaft in the coordinate frame of the grinding machine; first and second drive axis controllers (80 and 76) coupled to said reference signal generating means and to said feedback means for comparing the first and second feedback signals with their respective first and second reference signals and to provide corresponding first and second control signals (106) to control the first and second drive mechanisms, respectively, the system being characterized by:

means for generating a kinematic model relating the coordinate frame of the camshaft to the coordinate frame of the grinding machine;

means for storing (28 and 34) a digital signal related to the desired contour of the cam lift section of at least one non-circular lobe (12 or 14) on the cam shaft to be ground at the grinding station to obtain digitized lift data;

means (28, 110) coupled to said storing means for generating a differentiable, periodic equation which approximates the lift data; and means (28, 128) for performing a conversion algorithm with the kinematic model and the differentiable equation to obtain an axis control function (Eqs. 1 and 14) including a position control function for each of the controlled axes of the grinding machine wherein the first and second reference signals are generated from their respective axis control function.

28. A system (26) for controlling a grinding machine having a coordinate frame including first and second drive mechanisms (72, 70) to control grinding of a camshaft (10) having a coordinate frame at a grinding station, the first drive mechanism moving a grinding wheel relative to the camshaft and the second drive mechanism rotating the camshaft, the system comprising feedback means (82, 78) adapted to be coupled to the first and second drive mechanisms for generating first and second feedback signals (92), respectively, the first and second feedback signals indicating the relative linear position of the grinding wheel with respect to the camshaft and the angular position of the camshaft, respectively; reference signal generating means (68, 85, 133) for generating first and second reference signals, the first reference signal corresponding to the desired relative linear position of the grinding wheel, and the second reference signal corresponding to the desired angular position of the camshaft in the coordinate frame of the grinding machine; first and second drive axis controllers (80, 76) coupled to said reference signal generating means and to said feedback means for comparing the first and second feedback signals with their respective first and second reference signals and to provide corresponding first and second control signals (106) to control the first and second drive mechanisms, respectively, the system being characterized by:

means for generating a kinematic model relating the coordinate frame of the camshaft to the coordinate frame of the grinding machine;

means for storing (28 and 34) a digital signal related to the desired contour of the cam lift section of at least one non-circular lobe (12 or 14) on the camshaft to be ground at the grinding station to obtain digitized lift data;

means (28 and 110) coupled to said storing means for generating a differentiable, periodic equation which approximates the lift data; and means (28, 128) for performing a conversion algorithm with the kinematic model and the differentiable equation to obtain an axis control function (Eqs. 1 and 14) including a position control function for each of the controlled axes of the grinding machine, wherein the first and second reference signals are generated from their respective axis control functions and wherein said reference signal generating means is coupled to said feedback means so that one of said reference signals is generated in response to the feedback signal of the other controlled axis (C-axis).

29. A system (26) for controlling a machine tool having a coordinate frame including first and second drive mechanisms (70, 72) to control machining of a workpiece (10) having a coordinate frame at a machining station, the first drive mechanism moving a work tool relative to the workpiece and the second drive mechanism rotating the workpiece, the system comprising feedback means (82, 78) adapted to be coupled to the first and second drive mechanisms for generating first and second feedback signals (92), the first and second feedback signals indicating the relative linear position of the work tool with respect to the workpiece and the angular position of the workpiece, respectively; reference signal generating means (68, 84, 85, 133) for generating first and second reference signals, the first reference signal corresponding to the desired relative linear position of the work tool with respect to the workpiece, and the second reference signal corresponding to the desired angular position of the workpiece in the coordinate frame of the machine tool; first and second drive axis controllers (80, 76) coupled to said reference signal generating means and to said feedback means for comparing the first and second feedback signals with their respective first and second reference signals and to provide corresponding first and second control signals (106) to control the first and second drive mechanisms, respectively, the system characterized by:

means for generating a kinematic model relating the coordinate frame of the workpiece to the coordinate frame of the machine tool;

means for storing (28 and 34) a digital signal related to the desired contour of at least a portion of the workpiece to be machined at the machining station to obtain digitized machining data;

means (28 and 110) coupled to said storing means for generating a differentiable, periodic equation which approximates the machining data; and means (28 and 128) for performing a conversion algorithm with the kinematic model and the differentiable equation to obtain an axis control function including a position control function for each of the controlled axes of the machine tool wherein the reference signals are generated from their respective axis control functions.

30. A system (26) for controlling a machine tool having a coordinate frame including first and second drive mechanisms (72, 70) to control machining of a workpiece (10) having a coordinate frame at a machining station, the first drive mechanism moving a work tool relative to the workpiece and the second drive mechanism rotating the workpiece, the system comprising feedback means (82, 78) adapted to be coupled to the first and second drive mechanisms for generating first and second feedback signals (92), respectively, the first and second feedback signals indicating the relative linear position of the work tool with respect to the workpiece and the angular position of the workpiece, respectively; reference signal generating means (68, 84, 85, 133) for generating first and second reference signals, the first reference signal corresponding to the desired relative linear position of the work tool with respect to the workpiece, and the second reference signal corresponding to the desired angular position of the workpiece in the coordinate frame of the machine tool; first and second drive axis controllers (80, 76) coupled to said reference signal generating means and to said feedback means for comparing the first and second feedback signals with their respective first and second reference signals and to provide corresponding first and second control signals (106) to control the first and second drive mechanisms, respectively; the system being characterized by:

means for generating a kinematic model relating the coordinate frame of the workpiece to the coordinate frame of the machine tool;

means for storing (28 and 34) a digital signal related to the desired contour of at least a portion of the workpiece to be machined at the machining station to obtain digitized machining data;

means (28, 110) coupled to said storing means for generating a differentiable, periodic equation which approximates the machining data; and means (28, 128) for performing a conversion algorithm with the kinematic model and the differentiable equation to obtain an axis control function (Eqs. 1 and 14) including a position control function for each of the controlled axes of the machine tool wherein said reference signals are generated from their respective axis control function and wherein the reference signal generating means is coupled to the feedback means so that one of the reference signals (86) is generated in response to the feedback signal of the other controlled axis (C-axis).

31. The system as claimed in claim 27 or claim 28 wherein said feedback means (82, 78) also generates third and fourth feedback signals (98) indicating the relative linear velocity of the camshaft (10) with respect to the grinding wheel and the angular velocity of the camshaft, respectively, and wherein said first and second drive axis controllers (80, 76) utilize said third and fourth feedback signals to provide said first and second control signals (106), respectively.

32. The system as claimed in claim 29 or claim 30 wherein said feedback means also generates third and fourth feedback signals (98) indicating the relative linear velocity of the work tool with respect to the workpiece (10), and the angular velocity of the workpiece, respectively, and wherein said first and second drive axis controllers (80, 76) utilize said third and fourth feedback signals to provide said first and second control signals (106), respectively.

* * * * *